United States Patent
Bosma

(10) Patent No.: US 8,689,736 B2
(45) Date of Patent: Apr. 8, 2014

(54) AUTOMATIC MILK SEPARATION

(75) Inventor: Epke Bosma, Tumba (SE)

(73) Assignee: DeLaval Holding AB, Tumba (SE)

( * ) Notice: Subject to any disclaimer, the term of this patent is extended or adjusted under 35 U.S.C. 154(b) by 39 days.

(21) Appl. No.: 13/239,931

(22) Filed: Sep. 22, 2011

(65) Prior Publication Data

US 2012/0006270 A1 Jan. 12, 2012

Related U.S. Application Data

(62) Division of application No. 10/511,582, filed as application No. PCT/SE03/00676 on May 6, 2003.

(30) Foreign Application Priority Data

May 7, 2002 (SE) ........................................ 0201380

(51) Int. Cl.
*A01J 5/007* (2006.01)
*A01J 5/013* (2006.01)

(52) U.S. Cl.
CPC .............. *A01J 5/0132* (2013.01); *A01J 5/0135* (2013.01); *A01J 5/0136* (2013.01); *A01J 5/0138* (2013.01); *A01J 5/0137* (2013.01)
USPC ..................................... 119/14.02; 119/14.14

(58) Field of Classification Search
USPC .......... 119/14.02, 14.08, 14.14, 14.15, 14.17, 119/14.18, 14.01
See application file for complete search history.

(56) References Cited

U.S. PATENT DOCUMENTS

| | | | |
|---|---|---|---|
| 3,653,359 A | 4/1972 | Tolle | |
| 4,325,028 A | 4/1982 | Takahashi | |
| 5,704,311 A | 1/1998 | Van den Berg | |
| 5,743,209 A | 4/1998 | Bazin | |
| 5,771,837 A | 6/1998 | Van der Lely | |
| 5,873,323 A | 2/1999 | Van den Berg | |
| 6,031,367 A | 2/2000 | Mangan | |
| 6,307,362 B1 | 10/2001 | Mangan | |
| 6,488,635 B1 | 12/2002 | Mottram | |
| 6,493,071 B2 | 12/2002 | Van den Berg | |
| 6,571,731 B1 | 6/2003 | Maier | |
| 6,694,830 B2 | 2/2004 | Hakes | |
| 6,742,474 B2 | 6/2004 | Van den Berg | |

(Continued)

FOREIGN PATENT DOCUMENTS

| | | |
|---|---|---|
| EP | 0 880 888 | 9/2002 |
| EP | 1 340 457 | 9/2003 |

(Continued)

OTHER PUBLICATIONS

A.M. Hussain et al., "The bactericidal effect of N-acetyl-b-D-glucosaminidase on bacteria", Veterinary Microbiology, 32:1, 75-80 (1992).

*Primary Examiner* — Son T Nguyen

(74) *Attorney, Agent, or Firm* — Young & Thompson

(57) ABSTRACT

An indicating system for use in a milking system including an automated milking machine with a method for detecting mastitis of a milking animal in an automated milking machine, includes a first device for automatically obtaining and determining a first indicator of mastitis; a second device for automatically obtaining and determining a second indicator of mastitis; a processor operatively connected to the first and second devices and configured for automatically i) evaluating the first and second indicators of mastitis, and ii) identifying, based on the result the evaluation of the first and second indicators of mastitis, the need for a third indicator of mastitis.

13 Claims, 3 Drawing Sheets

(56) References Cited

U.S. PATENT DOCUMENTS

| | | |
|---|---|---|
| 6,981,466 B2 | 1/2006 | Lindholm |
| 7,114,458 B2 | 10/2006 | Sundborger |
| 7,681,523 B2 | 3/2010 | Holmertz |
| 7,870,840 B2 | 1/2011 | Valencia |
| 2002/0124803 A1 | 9/2002 | Chen |
| 2004/0154547 A1 | 8/2004 | Brown |
| 2004/0168643 A1 | 9/2004 | Nilsson |
| 2005/0126498 A1 | 6/2005 | Bosma |
| 2006/0260557 A1 | 11/2006 | McCabe |
| 2007/0272159 A1 | 11/2007 | Francke |

FOREIGN PATENT DOCUMENTS

| | | |
|---|---|---|
| WO | 99/01026 | 1/1999 |
| WO | 00/27183 | 5/2000 |
| WO | 00/39578 | 7/2000 |

AUTOMATIC MILK SEPARATION

TECHNICAL FIELD

The present invention relates to automatic milking machines and more particular to automatically separating milk, with high cell counts, collected with an automatic milking machine from milk with lower cell count.

BACKGROUND OF THE INVENTION

Mastitis is an infection which affects individual cows in a milking herd or even individual teats of a specific cow. Mastitis affects the quality of the milk in a negative way and makes the milk unsuitable for human consumption. Mastistis can be detected by visual inspection, by conductivity measurements, by measuring the NAgase value, measuring the temperature of the milk, measuring the milk flow or the milk quantity from a specific teat. However, most of the above mentioned methods only give rough indications on mastitis. Specifically will conductivity measurements, which is very suitable for automation, only give rough indications.

It is not unlikely that one or more animals, in a herd of milking animals served by an automatic milking machine, may be infected by mastitis. If the milk from an infected animal is collected in the same container as the milk from all other animals substantial economical loss may be incured since the milk in the container would be ruined or at least be of substantial lower quality.

In automatic milking machines it is vital that the milking machine is automated to the greatest possible extent. For instance would a visual inspection of all milk in an automatic milking machine by an operator remove many of the benefits of the automated milking process.

EP 628 244 B1 discloses a method and an apparatus using a conductivity measurement for obtaining an indication of mastitis and diverting milk based on this indication.

WO 98/50577 discloses a cell counter for measuring the somatic cell count in milk as an reliable indication on mastitis.

There thus exists a need in the art to automatically detect mastitis and prohibit milk from infected cows from being collected together with other milk.

SUMMARY OF THE INVENTION

It is a main object of the present invention to provide such apparatus and method that eliminates or at least reduces the problems with prior art.

It is in this respect a particular object of the invention to provide such apparatus and method that automatically detects milk with too high cell count and divert that milk either to a drain or a specific container.

These objects among others, according to a first aspect of the present invention, are attained by a method for separating a first quantity of milk drawn from a milking animal in an automatic milking machine from a second quantity of milk drawn from a milking animal in said milking machine. Said method comprises the steps of milking an animal using said automatic milking machine, collecting a small representative amount of said milk during said milking, analysing at least a part of said small representative amount of milk using an on-line cell counter for counting the number of cells in said milk, and operating a valve depending on the counted number of cells so that if the counted number of cells are below a threshold said milk is collected in a first container and if said counted number of cells are equal to or above said threshold said milk are directed to either a drain or a second container.

These objects among others, according to a second aspect of the present invention, are attained by an automatic milking machine comprising means for separating a first quantity of milk drawn from a milking animal in said automatic milking machine from a second quantity of milk drawn from a milking animal in said milking machine. Said automatic milking machine further comprises a collecting device for collecting a small representative amount of said milk during said milking, an on-line cell counter for analysing at least a part of said small representative amount of milk for counting the number of cells in said milk, and at least a first valve operable to direct said milk depending on the counted number of cells, so that if the counted number of cells are below a threshold said milk is collected in a first container and if said counted number of cells are equal to or above said threshold said milk is directed to either a drain or a second container.

According to a preferred embodiment of the invention a conductivity measurement is taken of the extracted milk and an on-line cell count is only performed if the conductivity of the milk is above a specific threshold.

An advantage of the present invention is that mastitis milk can be detected and diverted automatically without the need of manual intervention.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given hereinbelow and the accompanying FIGS. 1-3, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
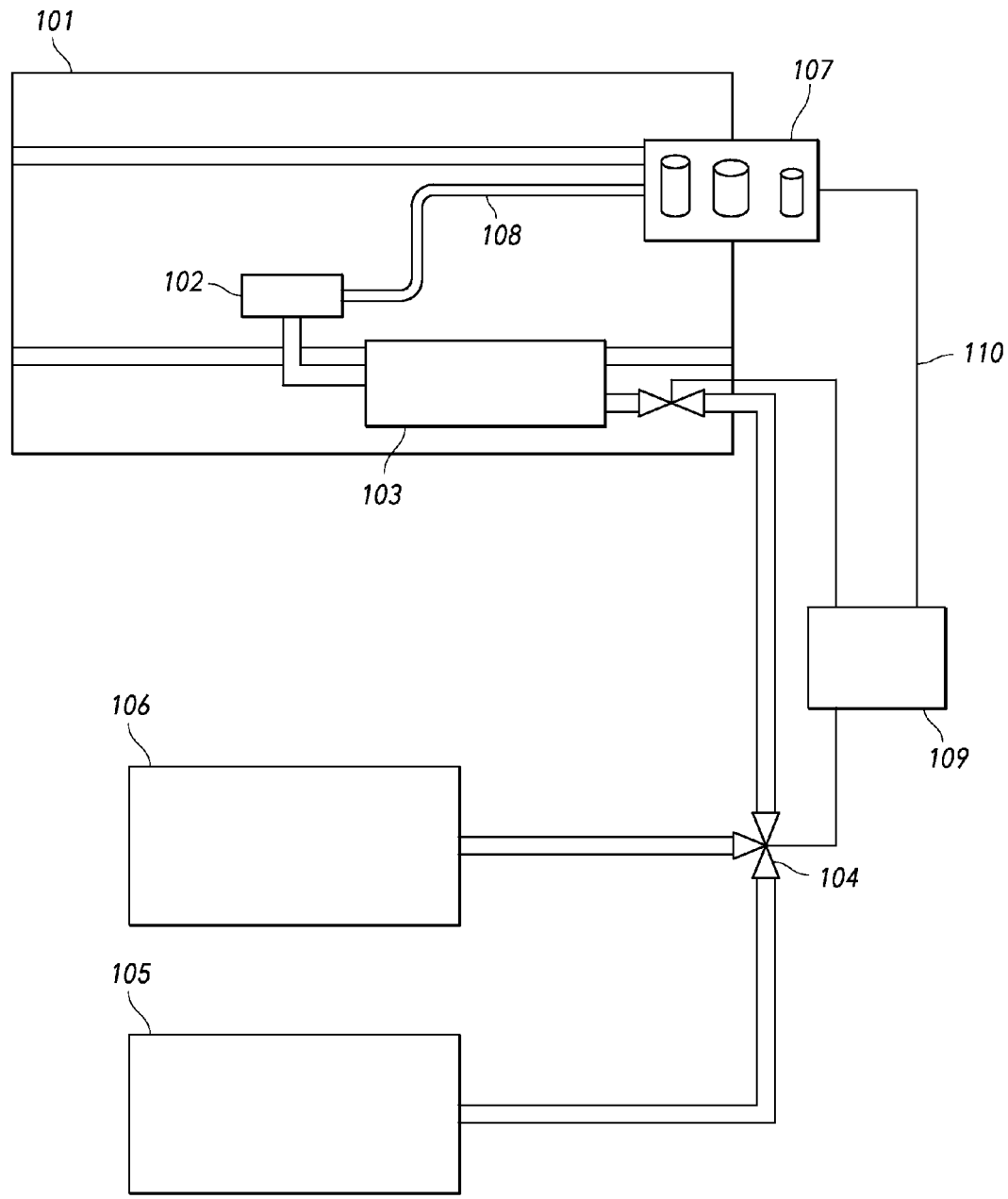
FIG. 1 shows a schematic view of an automatic milking machine according to a preferred embodiment of the invention.

FIG. 1 shows a schematic drawing of an automatic milking machine 100 according to a preferred embodiment of the invention comprising an conventional automatic milking robot 101 having all features conventionally associated with automatic milking robots, such as an animal identification system, automatic application of teat cups, automatic cleaning of teats and equipment etc., as well as for instance a conductivity measurement means (not shown). Among other conventional things the automatic milking robot 101 comprises a per ce conventional milk meter 102 for measuring the milk drawn from a milking animal. The milk from one animal is conveyed from the milk meter 102 to an end unit 103 for storage of all milk drawn from one animal at a single milking. From the end unit 103 tubing extends to a valve 104 and from the valve 104 to a first milk container 105 and a second milk container 106. The first and second milk containers, 105 and 106, can be conventional milk tanks comprising cooling functionality or could alternatively be simple buckets.

An on-line cell counter 107 is connected to the milk meter 102 through tubing 108. A cell counter suitable for on-line application is more specifically described in WO98/50577 Assigned to Chemometec A/S. The on-line cell counter 107 is operable to take a sample of the milk from the milk meter and analyse this milk sample to obtain a value regarding the somatic cell count of the milk from a specific animal. In this context on-line is regarded to mean that no manual intervention is required to take the milk sample from the milk machine, perform a cell count and report the result to a computer. A computer 109 is connected to the on-line cell counter 107 through a communication means 110 as well as to the automatic milking robot 101 through similar communication means (not shown). Alternatively, the computer 109 may be a computer controlling the automatic milking machine 101. The computer 109 also controls the valve 104 as will be described in more detail below.

Figure 2:
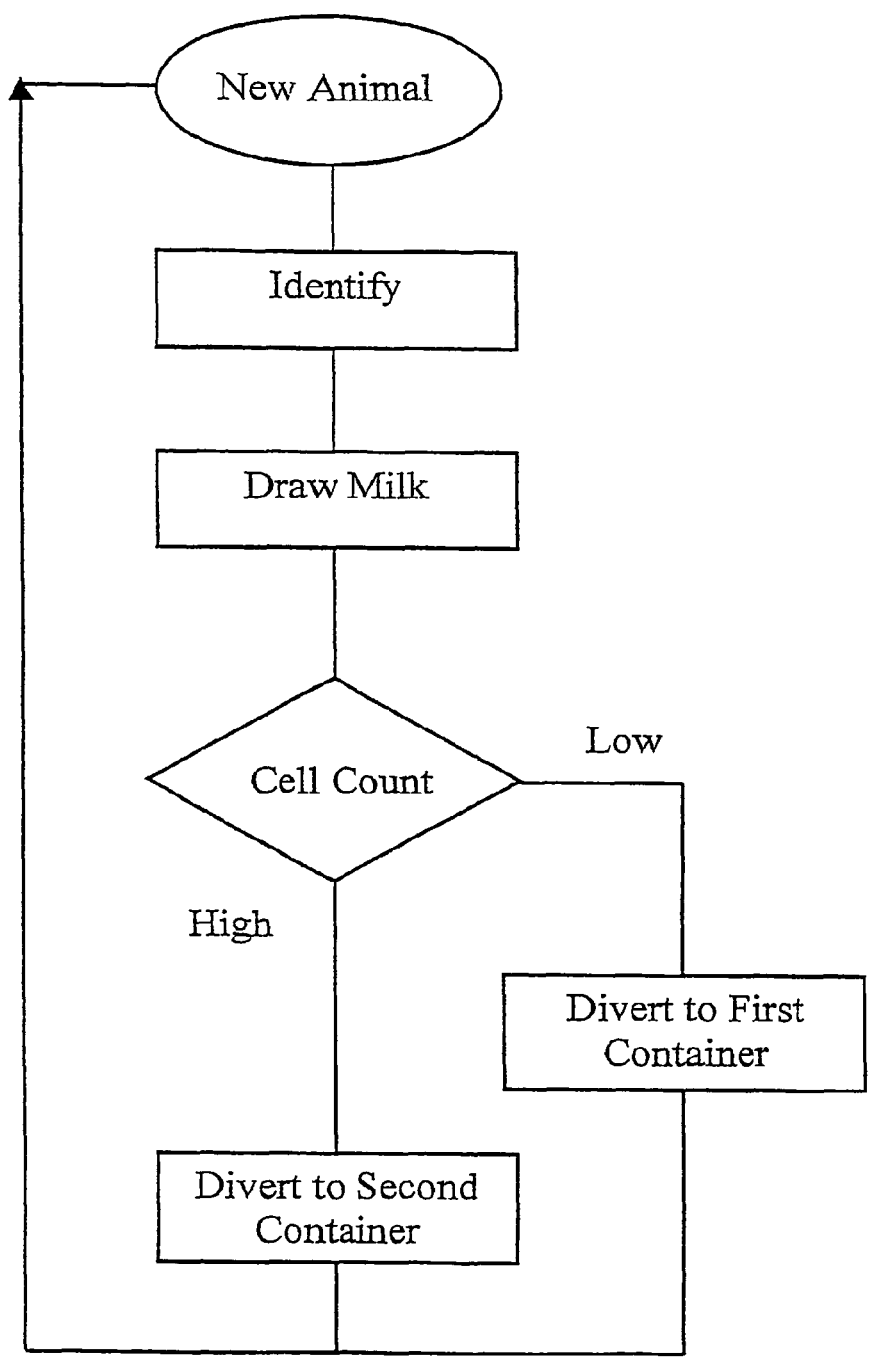
FIG. 2 shows a flow diagram of a method according to a preferred embodiment of the invention.

The function of the automatic milking machine 100 in FIG. 1 will now be more detailed with reference to FIG. 2, which shows a flow diagram according to a preferred embodiment of the invention. When a new milking animal enters the milking robot 101 an identification device (not shown) identifies the animal and reports the identity to the computer 109. The computer 109 keeps record of all milking animals in the herd presently served by the automatic milking machine 100 and whether a cell count of the milk should be taken using the on-line cell counter 107.

Different criteria could be used for this decision. For instance, the farmer may decide that all animals should be tested and thus the computer 109 will order the on-line cell counter 107 to measure the cell count for all animals being milked by the automatic milking machine 100. On the other hand, the farmer may order that only specific animals should be tested, possibly known to be specifically sensitive to infection, or that random animals, according to a specific distribution, should be tested.

If the computer 109 decides that a cell count for the milk drawn from the animal currently present in the automatic milking robot 101 should be performed milk is drawn from the milking meter 102 through the tubing 108 by a pump (not shown). The tubing 108 is a two-way tubing so that milk can be circulated from the milk meter 102 through tubing 108 and the on-line cell counter 107 back to the milk meter 102. By circulating the milk new fresh milk from the animal to be tested will wash away residue milk from a previouse tested animal. This will reduce the risk of earlier measurements affecting the result of the present measurement as well as reduce the complexity of the device since no specific means are required for washing the on-line cell counter and the tubing 108 between measurements. The on-line cell counter and the tubing 108 is washed with washing liquid during the normal washing sequence of the milking machine. The pump may be continuously running or may be ordered to start and stop by the computer 109.

Thus, while the milk from the milking animal is collected in the end unit 103, the on-line cell counter 107 measures the somatic cell count of the milk. The measurement result is reported to the computer 109 through the link 110.

If the somatic cell count is above a threshold the computer controls the three-way valve 104 to direct the milk from the end unit 103 to the second milk container 106 which holds milk of lower quality or milk unsuitable for human consumption or or milk for feeding calves or milk according to any other suitable criteria, or directs the milk from the end unit 103 to the drain. On the other hand, if the somatic cell count is below the threshold the milk is directed to the first milk container which comprises milk of fine quality. Thus an on-line, automatic separation has been achieved based on the somatic cell count of the milk without any manual intervention.

The threshold(s) can be set by the farmer based on his experience from the particular herd. Within EU the diary limit is 400,000 cells and cell counts below that value may be rewarded with a bonus. If the farmer knows that most animals in the herd has values well below 400,000 cells, he may set the threshold substantially higher, for instance 1,000,000, 2,000,000 or even 3,000,000 cells since the value measured by the diary will be an average over all the animals in the herd.

Figure 3:
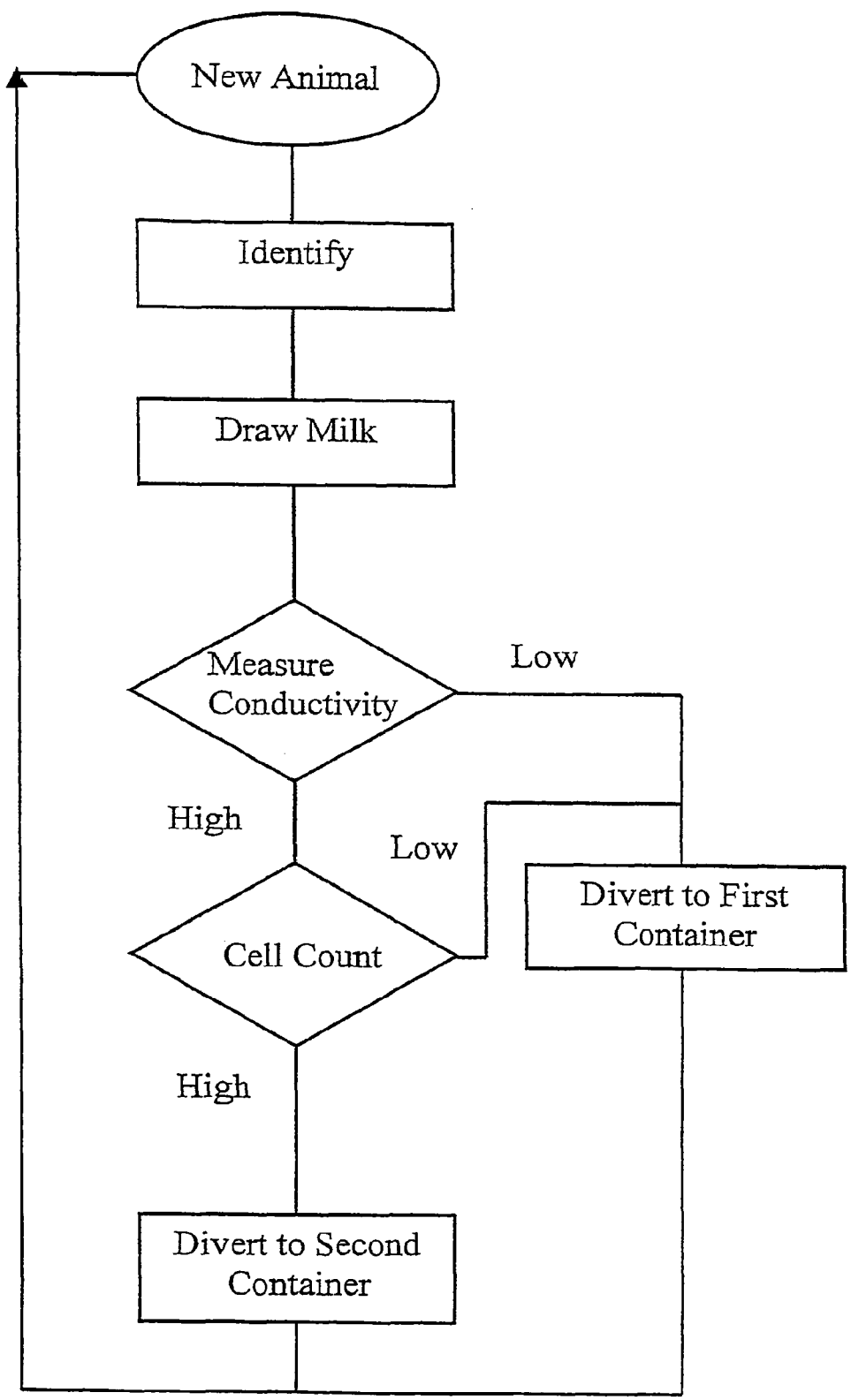
FIG. 3 shows a flow diagram of a method according to another preferred embodiment of the invention.

With reference to FIG. 3 showing a flow diagram of another preferred embodiment according to the invention, an animal enters the milking robot 101 and is identified by an identification device (not shown). The identity is reported to the computer 109. Milk is drawn from the animal in a per ce conventional way and eventually reaches the milk measurement device 102. In this embodiment, the milk measurement device comprises a conductivity measurement device (not shown) for measuring the conductivity of the milk. A high conductivity of the milk is a possible indication of mastitis. The conductivity measurement can be performed at the beginning of the milk sequence or at the middle or towards the end or during the complete sequence. The conductivity measurement device need not necessarily be placed at the milk measurement device but may indeed be placed anywhere the milk passes, such as in a teat cup, in the tubing, in the end unit etc. The result of the conductivity measurement is reported to the computer 109, which may comprise means for processing the results, such as computing an average etc. If the conductivity measurement indicates a conductivity above a second threshold the computer 109 orders the on-line cell counter 107 to perform a somatic cell count on the milk. On the other hand, if the conductivity is below said second threshold no somatic cell count will be performed and the milk will be diverted to the first milk container 105. The second threshold could for instance be 10% or 20% above the average conductivity normally measured for that specific animal.

If the measurement from the on-line cell counter 107 is above a first threshold the computer 109 directs the milk from the end unit 103 to the second milk container 106 and if the measurement indicates a somatic cell count below said first threshold the milk is directed to said first milk container 105.

As an alternative, another pre-indication of mastitis may be used instead of the conductivity measurement. Such indication could for instance be a measurement of the enzyme NAGase (N-acetyl glucosaminidase) where a higher value than normal would indicate mastitis, the milk flow where a lower value than normal would indicate mastitis, milk temperature where a higher value than normal would indicate mastitis, milk quantity per quarter where a lower value than normal would indicate mastitis etc. A combination of the indicators above could also be used. For instance would a high milk temperature together with a lower milk flow than normal give a more reliable indication of mastitis.

More than two milk tanks may be used for separating the milk and milk can thus be separated in degrees of quality based on somatic cell count. In this case several thresholds are used to separate the milk. If the cell count is below a first threshold it is regarded as being of a first, superior quality and is directed to a first container. If the cell count is above the first threshold but below a third threshold (the second threshold is used for conductivity measurements as in the embodiment above) it is directed to a second container with lower quality, but which may still be fine enough for feeding calves or other animals. However, if the cell count is above the third threshold the milk is diverted to a third container or to the drain.

It would be advantageous to measure the conductivity in the beginning of the milking sequence since this would give an early indication if a cell count should be performed. If the conductivity is measured at the end of the milking sequence, no milk would longer be present in the milk measurement device 102. The on-line cell counter 107 would then need to fetch milk from the end unit 103. Care need then to be taken so that a representative sample of the milk is taken for the measurement since the milk may form layers.

It will be obvious that the invention may be varied in a plurality of ways. For instance, the invention has only been described in connection with a robotic automatic milking machine but could equally well be implemented in an automatic milking machine where teat cleaning an teat cup application is performed by hand. Such variations are not to be regarded as a departure from the scope of the invention. All such modifications as would be obvious to one skilled in the art are intended to be included within the scope of the appended claims.

The invention claimed is:

1. A method for detecting mastitis of a milking animal in an automated milking machine, comprising:
   during milking of said milking animal, the milking machine automatically determining a first indicator of mastitis from milk extracted from said milking animal during said milking of said milking animal, the first indicator being a first type of measurement indicating mastitis;
   during said milking of said milking animal and from the milk extracted from said milking animal during said milking of said milking animal, the milking machine automatically determining a second indicator of mastitis, the second indicator being a second type of measurement indicating mastitis and different from the first type of measurement indicating mastitis;
   during said milking of said milking animal, automatically evaluating said first indicator of mastitis and said second indicator of mastitis for indication of mastitis of the milking animal; and
   identifying, based on the result from said step of evaluating, whether there is a need for a third indicator of mastitis to detect mastitis of the milking animal, wherein the third indicator is a third type of measurement indicating mastitis and is different from the first and second types of measurement indicating mastitis.

2. The method for detecting mastitis as claimed in claim 1, wherein said step of evaluating comprises averaging the determined first and second indicators.

3. The method for detecting mastitis as claimed in claim 1, wherein said steps of automatically determining said first and second indicators of mastitis are performed in the milking station during milking.

4. The method for detecting mastitis as claimed in claim 1, comprising the further step of, upon identifying the need for a third indicator of mastitis, the milking machine automatically determining the third indicator of mastitis from the milk extracted from said milking animal during said milking of the animal.

5. The method for detecting mastitis as claimed in claim 4, wherein said third indicator of mastitis is determined by performing a somatic cell count measurement.

6. The method for detecting mastitis as claimed in claim 1, wherein said first type of measurement indicating mastitis is a first one selected from the group consisting of: conductivity, somatic cell count, NAGase level, milk flow, milk temperature, and milk quantity.

7. The method for detecting mastitis as claimed in claim 6, wherein said second type of measurement indicating mastitis is a second one selected from the group consisting of: conductivity, somatic cell count, NAGase level, milk flow, milk temperature, and milk quantity, said first one and said second one being different types of measurement indicating mastitis.

8. The method for detecting mastitis as claimed in claim 1, wherein,
   said first type of measurement indicating mastitis is a higher milk temperature than normal,
   said second type of measurement indicating mastitis is lower milk flow than normal, and
   said third type of measurement indicating mastitis is a somatic cell count measurement.

9. A method for detecting mastitis of a milking animal, comprising:
   during milking of said milking animal, automatically determining a first indicator of mastitis from milk extracted from said milking animal during said milking of said milking animal, the first indicator being a first type of measurement indicating mastitis, said first type of measurement being other than a somatic cell count measurement;
   during said milking of said milking animal and from the milk extracted from said milking animal during said milking of said milking animal, automatically determining a second indicator of mastitis, the second indicator being a second type of measurement indicating mastitis and different from the first type of measurement indicating mastitis, said second type of measurement being other than the somatic cell count measurement;
   during the milking of said milking animal, automatically evaluating said first indicator of mastitis and said second indicator of mastitis for indication of mastitis of the milking animal;
   identifying, based on the result from said step of evaluating, whether there is a need for a third indicator of mastitis to detect mastitis of the milking animal, wherein said third indicator of mastitis is determined by performing, during said milking of said animal, the somatic cell count measurement on milk extracted from said milking animal during said milking of said milking animal; and
   making a mastitis detection determination based on said third indicator of mastitis.

10. The method for detecting mastitis as claimed in claim 9, wherein,
   said first type of measurement indicating mastitis is first one selected from the group consisting of: conductivity, NAGase level, milk flow, milk temperature, and milk quantity, and
   said second type of measurement indicating mastitis is second one selected from the group consisting of: conductivity, NAGase level, milk flow, milk temperature, and milk quantity, said first one and said second one being different types of measurement indicating mastitis.

11. The method for detecting mastitis as claimed in claim 1, wherein said first type of measurement indicating mastitis is a first one selected from the group consisting of: conductivity, NAGase level, milk flow, milk temperature, and milk quantity.

12. The method for detecting mastitis as claimed in claim 11, wherein said second type of measurement indicating mastitis is a second one selected from the group consisting of: conductivity, NAGase level, milk flow, milk temperature, and milk quantity, said first one and said second one being different types of measurement indicating mastitis.

13. The method for detecting mastitis as claimed in claim 9, wherein,
   said first type of measurement indicating mastitis is a higher milk temperature than normal, and
   said second type of measurement indicating mastitis is lower milk flow than normal.

* * * * *